April 12, 1938.  J. M. NOEL  2,114,096
MOWER
Original Filed Aug. 7, 1928   4 Sheets-Sheet 1
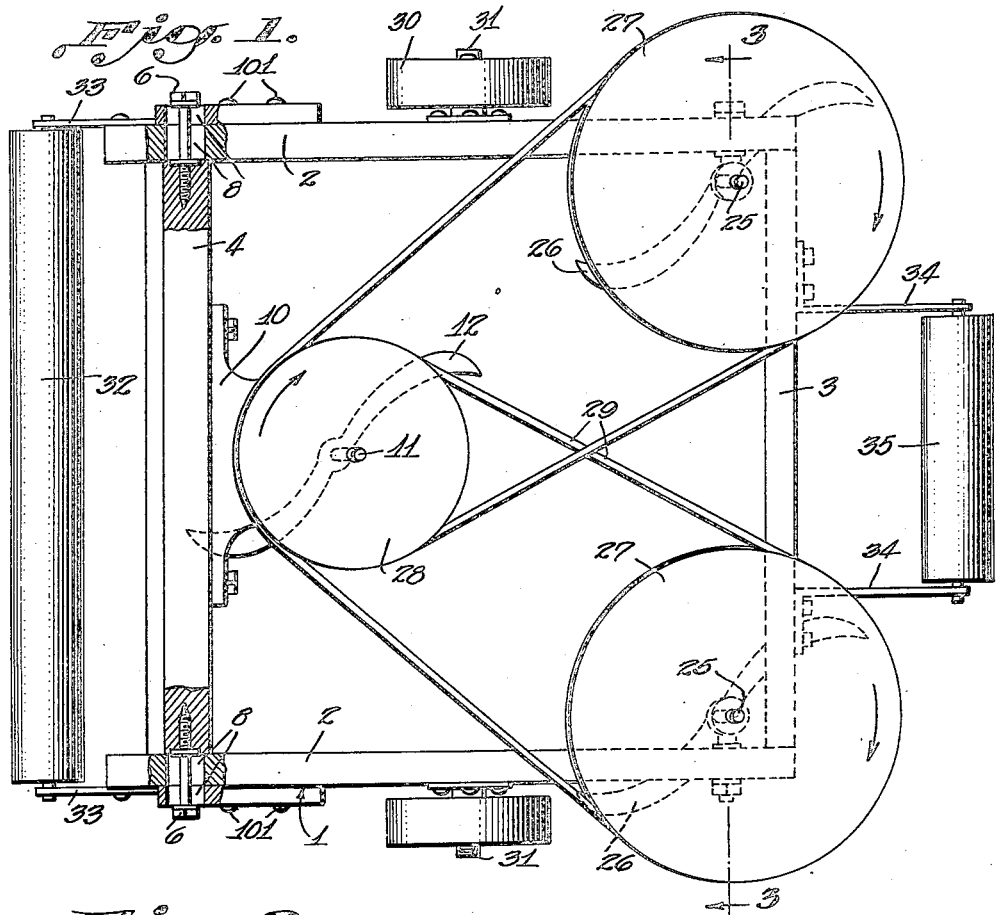
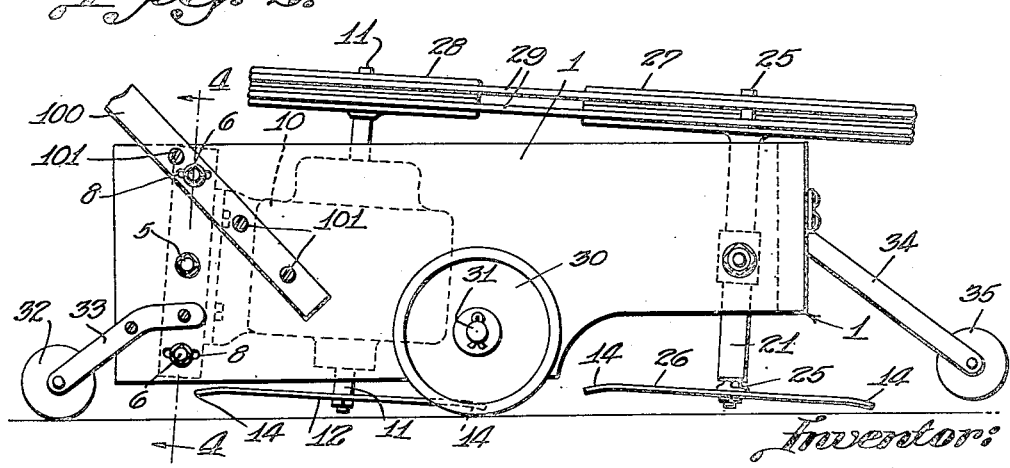

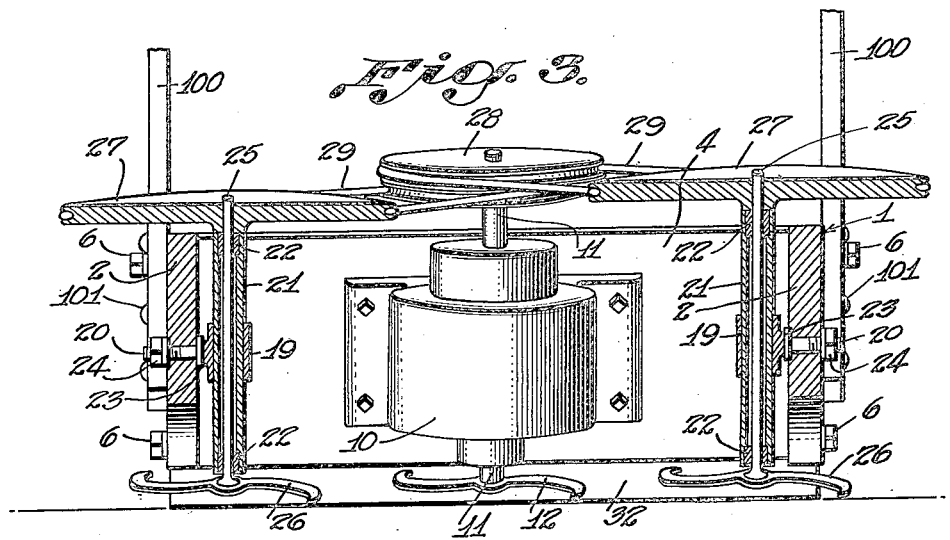
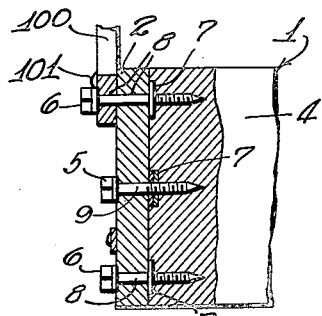
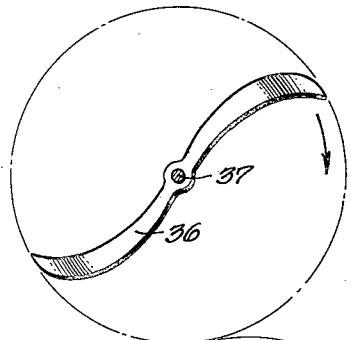
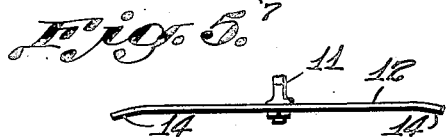
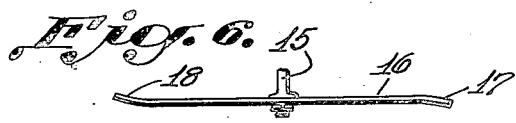
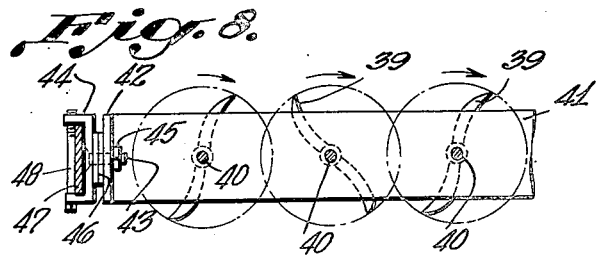

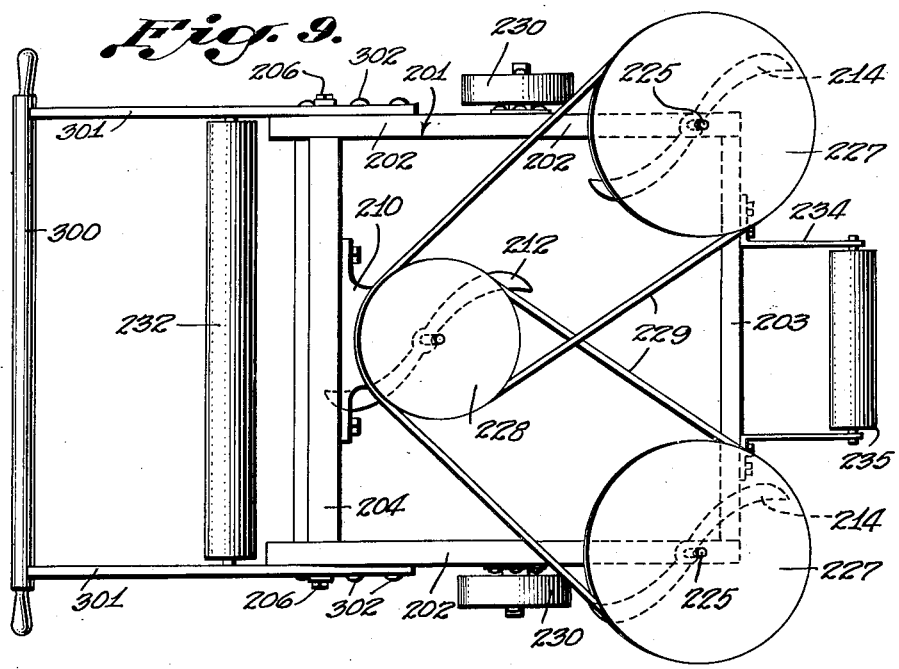
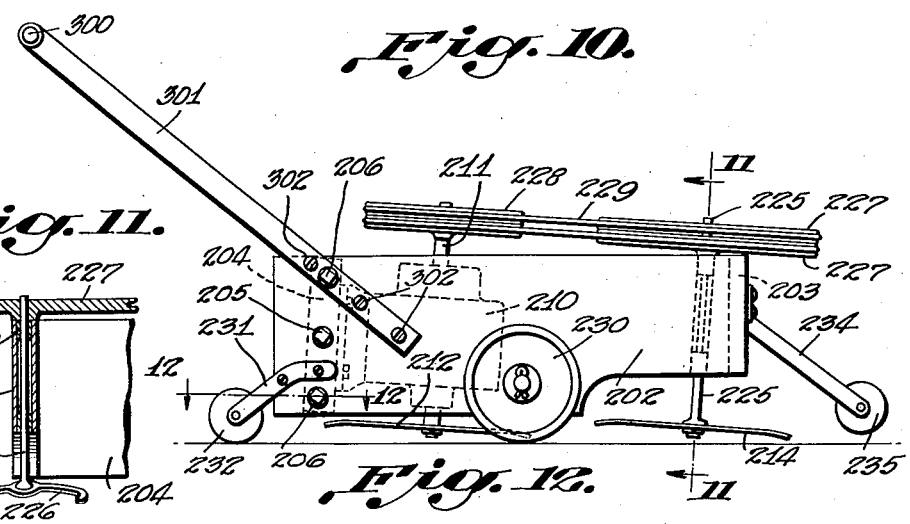
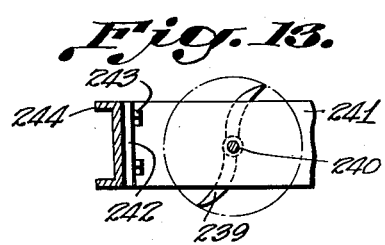

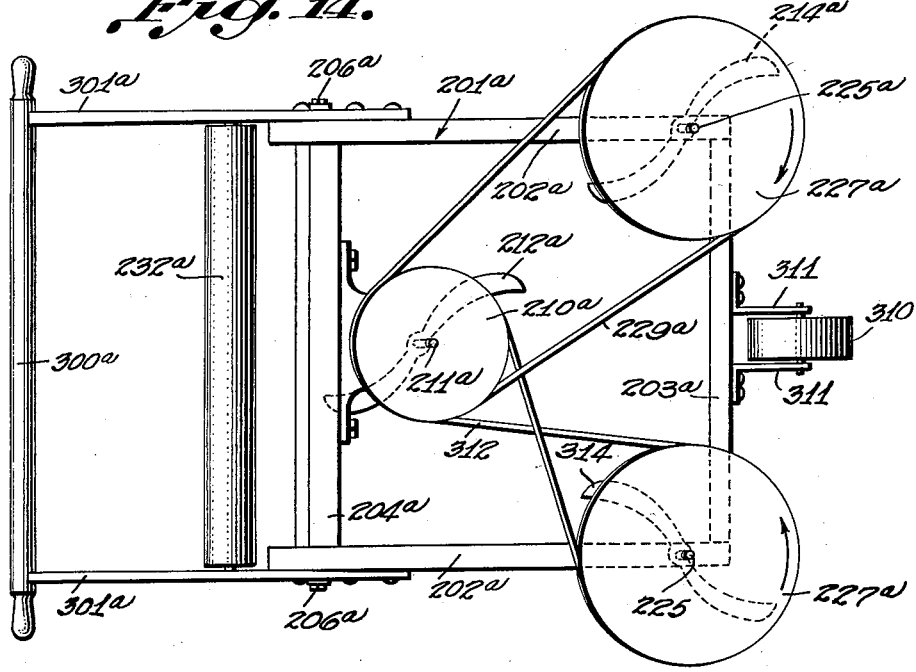
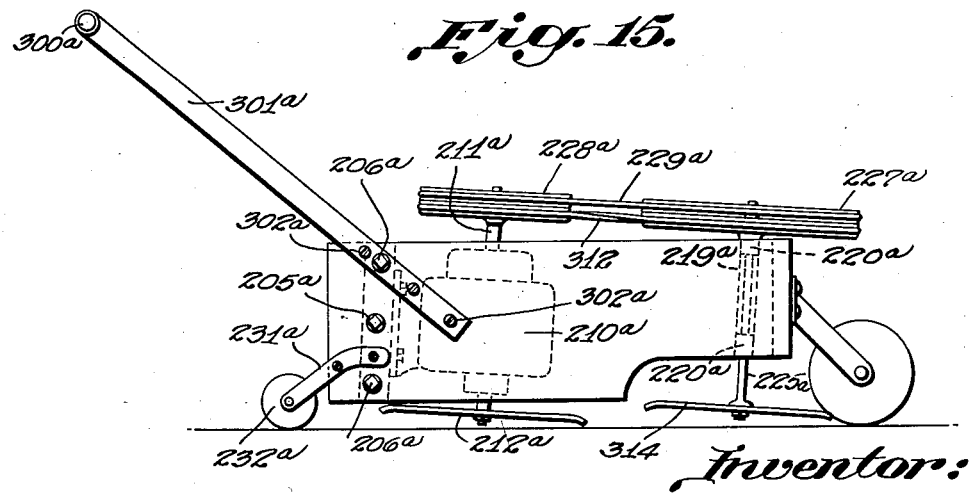

Patented Apr. 12, 1938

2,114,096

UNITED STATES PATENT OFFICE 2,114,096

MOWER

Joseph M. Noel, Cresson, Pa.; Elizabeth J. Noel, administratrix of said Joseph M. Noel, deceased, assignor to Harold A. Noel, Cresson, Pa.

Refiled for abandoned application Serial No. 297,972, August 7, 1928. This application August 11, 1934, Serial No. 739,485

3 Claims. (Cl. 56—25)

This invention aims to provide a simple means for mowing grass and other crops, the structure being peculiarly adapted for use in a lawn mower, although it may be employed in any sort of a mowing machine.

One object of the invention is to provide novel means for adjusting the blades at any desired angle with respect to the soil. Another object of the invention is to provide a machine of the class described in which a plurality of rotary blades or cutters may be arranged in the same plane with respect to the surface of the soil. A further object of the invention is to provide novel means for supporting the forward end of the machine when the machine runs up an incline, so that the cutters will not dig into the surface of the incline.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:—

Figure 1 shows in top plan, a device constructed in accordance with the invention;

Figure 2 is a side elevation;

Figure 3 is a cross section on the line 3—3 of Figure 1;

Figure 4 is a fragmental section taken approximately on the line 4—4 of Figure 2;

Figure 5 is an elevation showing one of the blades;

Figure 6 is an elevation showing a modified blade;

Figure 7 is a modification showing a different arrangement of the blades from that depicted in Figure 1;

Figure 8 is a fragmental plan showing how the invention may be used on an agricultural mower;

Figure 9 is a top plan showing a modified form of the invention;

Figure 10 is a side elevation of the structure disclosed in Figure 9;

Figure 11 is a section on the line 11—11 of Figure 10;

Figure 12 is a section on the line 12—12 of Figure 10;

Figure 13 is a section showing a modification;

Figure 14 is a top plan showing a modification;

Figure 15 is a side elevation showing the modification disclosed in Figure 14.

The numeral 1 marks a frame including side pieces 2, between which is fixed a front bar 3. A rear bar 4 is located between the side pieces 2 and although the rear bar 4 can be held in a fixed position, it is, nevertheless, adjustable about a horizontal axis represented by two oppositely disposed pivot elements, such as screws 5 threaded into the ends of the bar 4 and mounted to rock in openings 9 in the side pieces 2. Clamping devices are provided, the same preferably being in the form of screws 6 threaded into the ends of the rear bar 4 and movable in elongated slots 8 which are formed in the side pieces 2. Washers 7 are countersunk into the ends of the rear bar 4, and the pivot element 5 and the clamping screws 6 pass through the washers 7, the washers serving to strengthen the mounting of the elements 5 and 6 in the rear bar 4.

A prime mover of any desired kind, for instance, an electric motor 10, is secured to the rear bar 4 and lies within the contour of the frame 1. The shaft of the motor 10 is designated by the numeral 11, and to the lower end of it is secured a cutter 12, made up of oppositely disposed arms, shaped something like a scimiter. The arms of the cutter 12 may be downwardly inclined at their ends as shown at 14.

The numeral 100 marks the side bars of a handle by which the machine may be rolled along. The side bars 100 of the handle are connected by securing elements 101 with the side pieces 2 of the frame 1. The screws 6 pass through the bars 100 of the handle, and the slots 8, hereinbefore referred to, are located not only in the parts 2 of the frame 1, but in the handle bars 100, as well, this detail being shown in Figure 1 of the drawings.

Some prefer the arrangement shown in Figure 6, wherein the shaft is marked by the numeral 15, the cutter appearing at 16 and having a downwardly inclined end 17, and an upwardly inclined opposite end 18. The cutter 12 and the cutter 16, as well as the cutters 26 at the front of the machine (to be described hereinafter) may be called sweep-stroke cutters, to distinguish the cutters from a cylindrical cutter, like the cutter of an ordinary lawn mower, which turns on a substantially horizontal axis and does not operate with a sweeping cut.

Brackets 19 are disposed inside of the frame 1, near to the forward end of the frame, and against the side pieces 2. The brackets 19 have stems 20 which extend outwardly through the side pieces 2. Tubes 21 are secured intermediate their ends in the brackets 19 and occupy a position that is about vertical. In the ends of the tubes 21, bearings 22 are secured. It may be convenient to designate the brackets 19 and parts carried thereby as "bearing devices". The brackets 19 have lateral shoulders 23 which abut against the inner surfaces of the side pieces 2, nuts 24 being threaded on the outer ends of the stems 20, the nuts cooperating with the outer surfaces of the side pieces 2. Shafts 25 are journaled for rotation in the bearings 22 and are provided at their lower ends with cutters 26, which may be constructed as hereinbefore described in connection with the cutters 12.

On the upper ends of the shafts 25, pulleys 27 are secured, and a pulley 28 is secured to the upper end of the shaft 11 of the motor 10. The pulley 28 has a double tread, in which are mounted belts 29 engaged about the pulleys 27. For the support of the frame 1, wheels 30 are journaled at 31 on the side pieces 2 and are disposed about midway between the front and back ends of the frame 1. A roller 32 is located behind the frame 1 and is journaled on supports 33 which are secured to the side pieces 2. There are downwardly inclined arms 34 on the front bar 3 of the frame 1, a roller 35 being journaled on the arms 34. The machine ordinarily is rolled about upon the roller 32 and the wheels 30, with the roller 35 in spaced relation to the surface of the ground, as shown in Figure 2.

By loosening the clamping screws 6, the rear bar 4 may be swung with respect to the vertical, on the pivot element 5, and when the clamping screws are tightened up, the rear bar 4 will be held in any position to which it may have been tilted. Owing to the fact that the bar 4 can be tilted and held, as aforesaid, the cutter 12 may be arranged at any desired angle with respect to the surface of the soil. As shown in Figure 2, the front portion of the cutter 12 is nearest to the soil, the cutter slanting rearwardly and upwardly.

This is desirable because it enables the cutter to clear the stubble readily, after the grass is cut, and as the mower is moved forwardly. In order to adjust the cutters 26, so that they are inclined with respect to the surface of the ground, as indicated in connection with the cutter 12, the nuts 24 may be slacked away, the tubes tilted to the desired position, as shown in Figure 2, and the nuts tightened up, so as to bind the side pieces 2 between the nuts and the shoulders 23 (Figure 3).

The pulleys 27 are rotated from the motor 10 by means of the belts 29, and the shaft 11 of the motor rotates the cutter 12. The cutters 26 are spaced apart horizontally as shown in Figure 1, and each of the cutters 26 cuts its own swath. The strip of standing grass left between the cutters 26 is mowed down by the cutter 12. If desired, however, the cutter 12 may be omitted, recourse being had to the structure shown in Figure 7. Therein, the shafts 37 correspond to the shafts 25, and carry the cutters 36, these cutters corresponding to the front cutters 26 of Figure 1. The shafts 37 are so set, however, that, as shown at 38, there is no space between the swaths made by the cutters 36. As has been stated hereinbefore, the machine ordinarily rolls along on the members 32 and 30, the roller 35 being out of contact with the ground, as seen in Figure 2.

When, however, an incline is encountered, the roller 35 moves along the incline and raises the forward end of the frame 1, so that the forward cutters 26 will not dig into the ground as they rotate.

The general idea shown in the drawings and hereinbefore described, may be embodied in an agricultural mowing machine of large capacity. Thus, in Figure 8, a plurality of cutters 39, of the kind hereinbefore described, are carried by shafts 40 which are journaled in a bearing bar 41 the upturned ends 42 of which are connected by stud bolts 43 with brackets 44, nuts 45 being threaded on the stud bolts and engaging the ends 42 of the bearing bar. Spaced washers 46 are interposed between the ends 42 of the bearing bar 4 and the brackets 44. A support 47 of any desired kind, on the machine, is held within the bracket 44, at each end of the bar 41, by a securing device 48. The bar 41 can be raised and lowered and it can be tilted with respect to the horizontal and be held in tilted position by tightening up the nuts 45. In this way, the cutters 39 may be inclined, if desired, with respect to the surface of the soil, as shown in connection with the cutters 26 and 12 of Figure 2.

Referring to the form shown in Figures 9, 10, and 11, there is shown a frame 201 including side pieces 202 between which is located a front bar 203 and a rear bar 204. As has been stated hereinbefore, the bar 4 of Figure 1 is adjustable, with the screws 5 of Figure 2 as pivots, and with the screws 6 as clamping means. The rear bar 204 of Figures 9 and 10, is not adjustable, but is held securely in place by screws 205 and 206. The handle is shown at 300 and the side bars appear at 301. They are connected by securing elements 302, and by one of the screws 206, to the side pieces 202 of the frame 201.

An electric motor 210, or other prime mover, is secured to the rear bar 204, and is located within the frame 201. On the lower end of the shaft 211 of the motor 210 is mounted a cutter 212, of the kind hereinbefore described. Bores 219 are formed in the side pieces 202 of the frame 201, and bearings 220 are mounted in the bores 219. Shafts 225 are journaled in the bearings 220 and are supplied at their lower ends with cutters 214, which may be made as hereinbefore described in connection with the cutters 12.

Pulleys 227 are secured on the upper ends of the shafts 225, and a pulley 228 is secured to the upper end of the shaft 211 of the motor 210. Belts 229 are engaged about the pulleys 227, and about the pulley 228, the pulley 228 having a double tread. The supporting wheels 230 are mounted as hereinbefore described. The rear roller 232 is journaled on supports 231 mounted on the side pieces 202. The forward roller 235 is journaled on downwardly inclined arms 234, constructed like the arms 34 of Figure 2.

The operation of the device is practically the same as the operation of the structure shown in Figures 1 and 2, aside from the fact that the cutters 212 and 214 are not adjustable with respect to the surface of the soil.

In the form shown in Figures 9 and 10, as in the other forms, the device comprises a frame, a sweep-stroke cutter, means for mounting the cutter for rotation on the frame with the cutter disposed in a downwardly and forwardly slanting plane, thereby permitting the cutter to clear the stubble readily as the frame is moved forwardly, and means for rotating the cutter.

The modification shown in Figure 13 relates to the form shown in Figure 8. The cutters 239 are carried by vertical shafts 240 journaled in a bearing bar 241, the upturned ends 242 of which are connected by bolts 243 with channel bars 244.

In the modified form shown in Figures 14 and 15, parts hereinbefore described in connection with Figures 9-10-11-12 have been designated by numerals formerly used, with the suffix "a".

In the form shown in Figures 14 and 15, the wheels 230 of Figures 9 and 10 have been omitted. The forward wheel 310 is considerably narrower than the wheel 235, and the arms 311 are closer together than the arms 234. The belt 312 that connects the pulley 210a with one of the pulleys 227a is crossed, and the curvature of the corresponding cutter 314 is reversed as compared with the opposite cutter 214a. The cutters 314 and 214a rotate in opposite directions, and all of the grass is thrown toward the center of the machine, a scattering of the grass thus being avoided.

What is claimed is:

1. The combination with a wheel supported frame, of a pair of laterally spaced upright shafts at the forward part of the frame, a third upright shaft to the rear of the front shafts, cutters on said shafts, said shafts being supported revolvably on the frame, the rearwardly cutter shaft being positioned on a line which is located substantially at right angles to a line connecting the forwardly pair of cutter shafts and which substantially bisects this line, and means for rotating the shafts whereby the cutters may be operated.

2. The combination with a wheel supported frame, of a pair of laterally spaced upright shafts at the forward part of the frame, a third upright shaft to the rear of the front shafts, cutters on said shafts, said shafts being supported revolvably on the frame, the rearwardly cutter shaft being positioned on a line which is located substantially at right angles to a line connecting the forwardly pair of cutter shafts and which substantially bisects this line, and means for rotating the third shaft and means for connecting the third shaft with the other shafts whereby the cutters may be operated.

3. The combination with a wheel supported frame, of a pair of laterally spaced upright shafts at the forward part of the frame, a third upright shaft to the rear of the front shafts, cutters on said shafts, said shafts being supported revolvably on the frame, the rearwardly cutter shaft being positioned on a line which is located substantially at right angles to a line connecting the forwardly pair of cutter shafts and which substantially bisects this line, and means for turning said shafts whereby the cutters may be operated, the said forward cutters projecting laterally of, and outwardly from the frame.

JOSEPH M. NOEL.